(12) United States Patent
Watanabe

(10) Patent No.: US 10,698,380 B2
(45) Date of Patent: Jun. 30, 2020

(54) NUMERICAL CONTROLLER

(71) Applicant: FANUC CORPORATION, Minamitsuru-gun, Yamanashi (JP)

(72) Inventor: Toshihiro Watanabe, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 146 days.

(21) Appl. No.: 15/890,661

(22) Filed: Feb. 7, 2018

(65) Prior Publication Data

US 2018/0231953 A1 Aug. 16, 2018

(30) Foreign Application Priority Data

Feb. 15, 2017 (JP) ................................. 2017-026152

(51) Int. Cl.
*G05B 13/02* (2006.01)
*G05B 19/404* (2006.01)

(52) U.S. Cl.
CPC ....... *G05B 19/404* (2013.01); *G05B 13/0265* (2013.01); *G05B 2219/33034* (2013.01); *G05B 2219/36204* (2013.01); *G05B 2219/37232* (2013.01); *G05B 2219/49356* (2013.01)

(58) Field of Classification Search
None
See application file for complete search history.

(56) References Cited

U.S. PATENT DOCUMENTS

| | | | | |
|---|---|---|---|---|
| 5,473,532 A * | 12/1995 | Unno | ............... | G05B 19/40937 700/32 |
| 5,525,092 A * | 6/1996 | Hirano | .................... | B23B 29/00 451/10 |
| 5,555,178 A * | 9/1996 | Hashimoto | .......... | G05B 19/182 700/175 |
| 2004/0179915 A1* | 9/2004 | Hill | ..................... | B23Q 17/0971 409/131 |
| 2012/0129433 A1* | 5/2012 | Makiuchi | ................ | B24B 5/045 451/5 |
| 2013/0123968 A1 | 5/2013 | Nishibashi | | |

(Continued)

FOREIGN PATENT DOCUMENTS

| CN | 103140817 A | 6/2013 |
|---|---|---|
| CN | 105033288 A | 11/2015 |

(Continued)

OTHER PUBLICATIONS

Japanese Notification of Reasons for Refusal for Japanese Application 2017-026152, with English translation, dated Sep. 25, 2018—5 pages.

(Continued)

*Primary Examiner* — Thomas C Lee
*Assistant Examiner* — Gary Collins
(74) *Attorney, Agent, or Firm* — RatnerPrestia

(57) ABSTRACT

A numerical controller performs machine learning to calculate tailstock pressing force to stabilize behavior of a workpiece during lathe machining and acquires, as state information, current tailstock pressing force. Then, the numerical controller acquires, as determination data, current vibration or displacement of the workpiece, or power consumption by tailstock pressing force, updates a value function based on the acquired determination data, and outputs an adjustment value of the state information based on the updated value function.

4 Claims, 6 Drawing Sheets

(56) References Cited

U.S. PATENT DOCUMENTS

2017/0060104 A1    3/2017   Genma
2017/0090430 A1    3/2017   Nakazawa
2017/0348772 A1* 12/2017   Morimura ................ B25J 19/02

FOREIGN PATENT DOCUMENTS

| CN | 106885736 A | 6/2017 |
|---|---|---|
| CN | 106112027 B | 4/2018 |
| DE | 4208701 A1 | 9/1993 |
| JP | H0655310 A | 3/1994 |
| JP | H 10-80802 A | 3/1998 |
| JP | 2005199404 A | 7/2005 |
| JP | 2010120133 A | 6/2010 |
| JP | 6063013 B1 | 1/2017 |
| JP | 6063016 B1 | 1/2017 |
| JP | 2017045300 A | 3/2017 |

OTHER PUBLICATIONS

Decision to Grant a Patent for Japanese Application No. 2017-026152, dated Feb. 26, 2019, with translation, 5 pages.
Chinese Office Action for Chinese Application No. 201810151905.7, dated Nov. 21, 2019 with translation, 18 pages.
German Examination Report for German Application No. 10 2018 001 028.8, dated Feb. 3, 2020, with translation, 16 pages.

* cited by examiner (I)

(II)

(I)

(II)

NUMERICAL CONTROLLER

CROSS-REFERENCE TO RELATED APPLICATIONS

This application is a new U.S. Patent Application that claims benefit of Japanese Patent Application No. 2017-026152, filed Feb. 15, 2017 the disclosure of this application is being incorporated herein by reference in its entirety for all purposes.

BACKGROUND OF THE INVENTION

1. Field of the Invention

The present invention relates to a numerical controller and, in particular, to a numerical controller capable of automatically calculating optimum tailstock pressing force.

2. Description of the Related Art

When a workpiece (in particular, a long material) is subjected to lathe machining, a tailstock is used to improve machining accuracy. FIG. 1 is a schematic diagram showing the difference in the behavior depending on the presence or absence of a tailstock 4 when a workpiece 3 rotating with a spindle 2 is subjected to lathe machining.

It has been known that compared with the lathe machining of the workpiece 3 without a tailstock as shown in FIG. 1(I), an amplitude of the workpiece 3 becomes smaller when the tailstock 4 causing a pressing force to act on the workpiece 3 in its rotating shaft direction is applied to the workpiece 3 as shown in FIG. 1(II).

In recent years, some numerical control (NC) lathes (lathes controlled by a numerical controller) issue the command of tailstock pressing force according to a machining program. In this case, a numerical controller transfers a command value of a tailstock pressing force to tailstock axis servo according to a machining program, and the tailstock axis servo performs control to maintain torque at a constant value. Thus, constant tailstock pressing force is added to the workpiece.

In general, the greater a tailstock pressing force is the better machining accuracy is. Therefore, an improvement in accuracy may not be substantially achieved when tailstock pressing force is insufficient. However, if tailstock pressing force is too large, workpiece 3 may be deformed as shown in FIG. 2(I). Further, the breakage of the workpiece 3 may occur depending on the shape of the workpiece 3 as shown in FIG. 2(II). The deformation or the breakage of the workpiece 3 may not occur if the workpiece 3 is made of hard material, but there is a concern about the damage to a machine tool instead. In addition, too large tailstock pressing force results in the waste of power consumption. Accordingly, tailstock pressing force needs to be optimally adjusted.

Conventionally, tailstock pressing force is manually tuned. That is, a user has a need to edit the program command of tailstock pressing force in a machining program while observing a state of the workpiece. Further, when changing tailstock pressing force in real time according to a change in the shape of a workpiece due to machining, a user has a need to issue a program command for changing the tailstock pressing force on a case-by-case basis. For example, when the workpiece 3 is made gradually thinner by machining as shown in FIG. 2(II), it is assumed to reduce tailstock pressing force step-by-step to prevent breakage. In order to realize this, a user has a need to have the step of inserting a program command for changing the tailstock pressing force in a machining program.

As a related art, Japanese Patent Application Laid-open No. 10-080802 discloses a NC lathe having the function of determining tailstock pressing force based on the specifications of a workpiece.

However, the aforementioned Japanese Patent Application Laid-open No. 10-080802 does not disclose the adaptive adjustment of tailstock pressing force with respect to a change in the shape of a workpiece under machining. In addition, it does not also disclose the adjustment of tailstock pressing force from the view of reducing power consumption by tailstock pressing force, i.e., from the view of reducing the waste of tailstock pressing force.

SUMMARY OF THE INVENTION

The present invention solves the above problems and provides a numerical controller capable of automatically calculating optimum tailstock pressing force.

A numerical controller according to an embodiment of the present invention has a tailstock pressing force calculation section that performs machine learning to calculate tailstock pressing force to stabilize behavior of a workpiece during lathe machining. The numerical controller acquires preconditions including current shape of the workpiece, acquires, as state information, current tailstock pressing force, acquires, as determination data, at least one of current vibration or displacement of the workpiece, and power consumption with the occurrence of tailstock pressing force, updates a value function based on the determination data, and outputs an adjustment value of the state information based on the value function.

The current shape of the workpiece can be expressed by the diameter of the workpiece or a feature amount acquired from an image of the workpiece.

The determination data can be acquired from at least one of a sensor provided in a tool and a motor of a spindle, a tool control axis, or the tailstock axis.

According to an embodiment of the present invention, it is possible to provide a numerical controller capable of automatically calculating optimum tailstock pressing force.

DETAILED DESCRIPTION OF THE PREFERRED EMBODIMENTS

Figure 1:
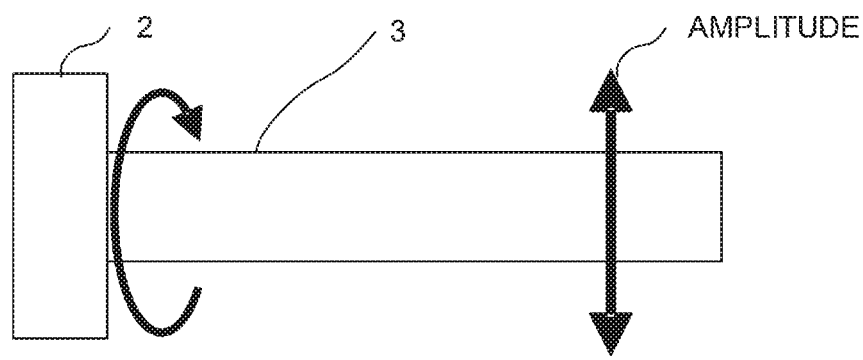
FIG. 1 is a diagram for describing influence on machining accuracy depending on the presence or absence of a tailstock.
Figure 1:
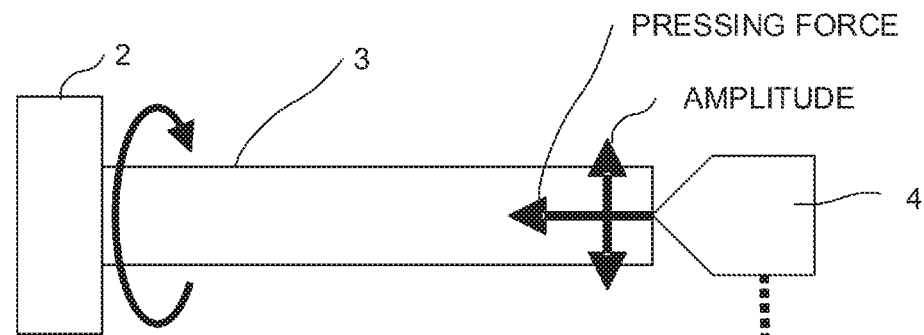
Figure 1:
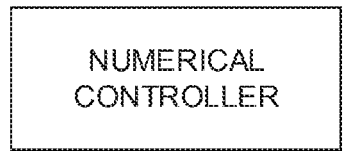
Figure 2:
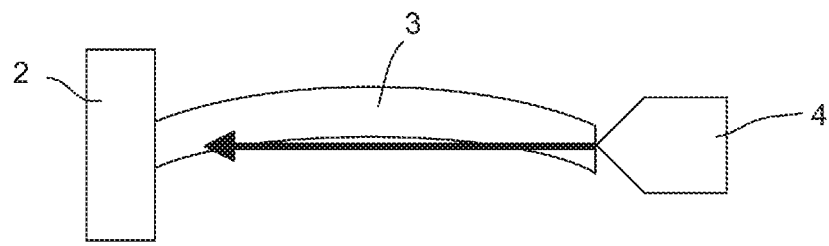
FIG. 2 is a diagram for describing the necessity of optimizing a tailstock pressing force.
Figure 2:
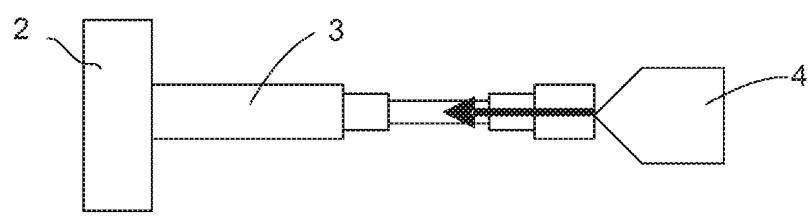

In the present invention, a machine learning device acting as artificial intelligence is introduced into a numerical controller that controls a NC lathe. The machine learning device simulates the lathe machining of a workpiece with tailstock pressing force added thereto in a state in which respective values of shape and material of the workpiece to be processed, spindle speed, cutting amount, and so on are acquired as machining preconditions. In this case, using the magnitude of tailstock pressing force as data on a machining state, the device performs machine learning on the adjustment of tailstock pressing force with respect to the data on the machining state. It enables to derive optimum degree of tailstock pressing force corresponding to the machining preconditions.

Hereinafter, a brief description of machine learning, which is introduced into the present invention, will be given.

(1) Machine Learning

We will briefly describe machine learning now. Machine learning is a framework that useful rules, knowledge expressions, determination criteria, etc. are extracted by analysis of dataset input to a device (hereinafter called a machine learning device). Although machine learning is performed using various methods, they are roughly classified into "supervised learning," "unsupervised learning," and "reinforcement learning." In addition, in order to implement such methods, how to characteristic features is learned itself, which is called "deep learning.".

The "supervised learning" is a method to obtain the relationship between input and output (label) inductively from numerous data pairs of input and output. The method can be implemented by such an algorithm using neural network, which will be described later.

The "unsupervised learning" is a method to compress, classify, or form input data even if corresponding output data is not given. The input dataset can be arranged in clusters with similar features by using this method. By setting any standard and allocating output to optimize them with use of the result the output can be predicted. In addition, as an intermediate problem setting between the "unsupervised learning" and the "supervised learning", there is a method called "semi-supervised learning", which some parts are exclusively given sets of input and output data while the other parts are given only input data. In this embodiment, the data obtained even though a machining tool does not actually operate is used in the unsupervised learning, which enables efficient learning.

The "reinforcement learning" is a method to choose an optimum action taking account of the effect from the action and learn the action to maximize reward that will be obtained in the future. In reinforcement learning, a machine learning device can start learning from the state in which the machine learning device does not completely know or imperfectly knows results issued by actions. In addition, a machine learning device can start learning from a desirable state in which prior learning (a method such as the above supervised learning and inverse reinforcement learning) is performed to imitate humans' actions.

Note that when machine learning is applied to a machining machine such as an NC lathe, it is necessary to consider that results are not obtained until the machining machine actually starts operation, that is, optimum actions should be searched in a trial and error manner. Thus this invention chooses a reinforcement learning algorithm where the machine learning device automatically learns the optimum actions to achieve a goal.

Figure 5:
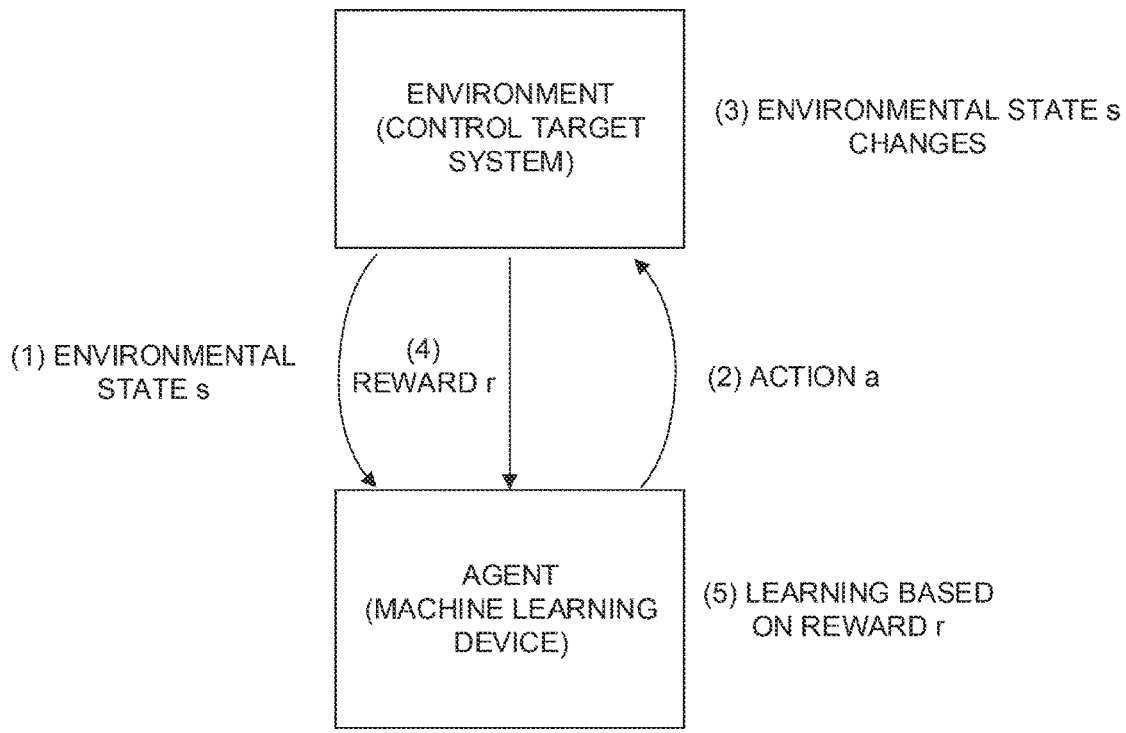
FIG. 5 is a diagram showing the operation of the numerical controller according to the embodiment.

FIG. 5 describes the basic concept of a reinforcement learning algorithm.

In reinforcement learning, by an interaction between an agent (machine learning device) as a learning subject and an environment (control target system) as a control target, learning and action of the agent are advanced. More specifically, the agent and the environment interact as follows.

(1) The agent observes an environmental condition $s_t$ at a certain time.

(2) Based on the observation result and past learning, the agent performs an action $a_t$ that the agent can choose.

(3) The environmental condition $s_t$ changes to a next state $s_{t+1}$ based on any rule and performance of the action $a_t$.

(4) The agent gets reward $r_{t+1}$ based on the state change as a result of the action $a_t$.

(5) The agent advances the learning based on the state $s_t$, the action $a_t$, the reward $r_{t+1}$, and a past learning result.

At the initial stage of the reinforcement learning, the agent does not know the value evaluation standard for selecting the optimum action $a_t$ with respect to the environmental condition $s_t$ in the above action selection (2). Therefore, the agent selects various actions $a_t$ in a certain state $s_t$ and learns which action is better, i.e., the standard of appropriate value judgment based on reward $r_{t+1}$ given with respect to the actions $a_t$ at that time.

In the above learning (5), the agent acquires the mapping of an observed state $s_t$, an action $a_t$, and reward $r_{t+1}$ as reference information for determining the amount of reward that the agent can obtain in the future. For example, when the number of states at each time is m and the number of actions is n, the agent obtains a two-dimensional array of m×n, which stores the reward $r_{t+1}$ corresponding to pairs of states $s_t$ and actions $a_t$, by repeating actions.

Then, with a function (value function) indicating the value of a state or an action that is selected based on the above mapping, the agent learns the optimum action corresponding to each state by updating the value function while repeating actions.

A "state value function" is a value function indicating the value of a certain state $s_t$. The state value function is expressed as a function using a state as argument, and updated in learning with action repetition based on the reward obtained for an action in a certain state, the value of a future state according to the action, or the like. The update formula of the state value function is defined according to a reinforcement learning algorithm. For example, in temporal-difference (TD) learning known as one of reinforcement learning algorithms, the state value function is updated by the following formula (1). Note that in the following formula (1), α is called a learning coefficient, γ is called a discount rate, and the learning coefficient and the discount rate have values within 0<α≤1 and 0<γ≤1, respectively.

$$V(s_t) \leftarrow V(s_t) + \alpha[r_{t+1} + \gamma V(s_{t+1}) - V(s_t)] \quad (1)$$

In addition, an "action value function" is a value function defining the value of an action $a_t$ in a certain state $s_t$. The action value function is expressed as a function using a state and an action as argument, and updated in learning with action repetition based on the reward obtained for an action in a certain state, an action value of a future state according to the action, or the like. The update formula of the action value function is defined according to a reinforcement learning algorithm. For example, in a well-known reinforcement learning algorithm of Q-learning, the action value function is updated by the following formula (2). Note that in the following formula (2), α is called a learning coefficient, γ is called a discount rate, and the learning coefficient and the discount rate have values within 0<α≤1 and 0<γ≤1, respectively.

$$Q(s_t, a_t) \leftarrow Q(s_t, a_t) + \alpha\left(r_{t+1} + \gamma \max_a Q(s_{t+1}, a) - Q(s_t, a_t)\right) \quad (2)$$

The above formula expresses a method to update an evaluation value $Q(s_t, a_t)$ of an action $a_t$ in a state $s_t$ based on reward $r_{t+1}$ returned as a result of the action $a_t$. This formula indicates that a value of an action in each state gets closer to a value for reward immediately gained as a result of the action and the best action in the next state accompanied by the action.

In Q-learning, such an update is repeatedly performed to finally set $Q(s_t, a_t)$ to expected value $E(\Sigma \gamma^t r_t)$ (the expected value is one taken when a state is changed according to the optimum action. Since the expected value is unknown as a matter of course, it is necessary to learn the expected value by search).

Further, in the above action selection (2), an action $a_t$ is selected by using a value function (evaluation function) generated by past learning so that the reward ($r_{t+1}$+ $r_{t+2}$+ . . . ) over the future will be maximized in the current state $s_t$ (An-action to change to the most valuable state is selected when a state value function is used, or the most valuable action in the state is selected when an action value function is used). Note that during learning, an agent can select a random action with a constant probability for advancing the learning in the above action selection (2) (6 greedy method).

To store a value function (evaluation function) as a learning result, there are a method by retaining values of all the pairs (s, a) of states and actions in a table form (action value table) and a method by using a function approximating the above value function. According to the latter method, the above update formula can be implemented by adjusting parameters of an approximate function based on a method such as probabilistic gradient descent. For the approximate function, a supervised learning device such as a neural network can be used.

Figure 6:
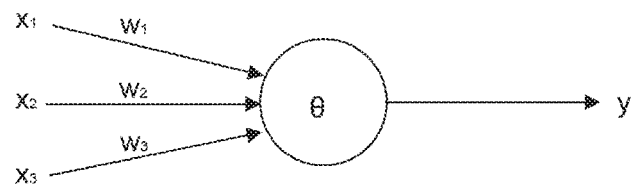
FIG. 6 is a diagram showing the operation of the numerical controller according to the embodiment.

The neural network consists of a calculation unit, a memory, and the like. It models a neuron as shown in FIG. 6, for example. FIG. 6 is a schematic diagram of a neuron model.

As shown in FIG. 6, a neuron has an output y with respect to input x (for example, input $x_1$ to $x_3$). Each input $x_1$ to $x_3$ is multiplied by the corresponding weight w ($w_1$ to $w_3$). Thus, the neuron outputs the output y expressed by the following formula (3). Note that in the following formula (3), input x, output y, and weight w are all vectors. In addition, θ indicates a bias, and $f_k$ indicates an activation function.

$$y = f_k(\Sigma_{i=1}^n x_i w_i - \theta) \quad (3)$$

Figure 7:
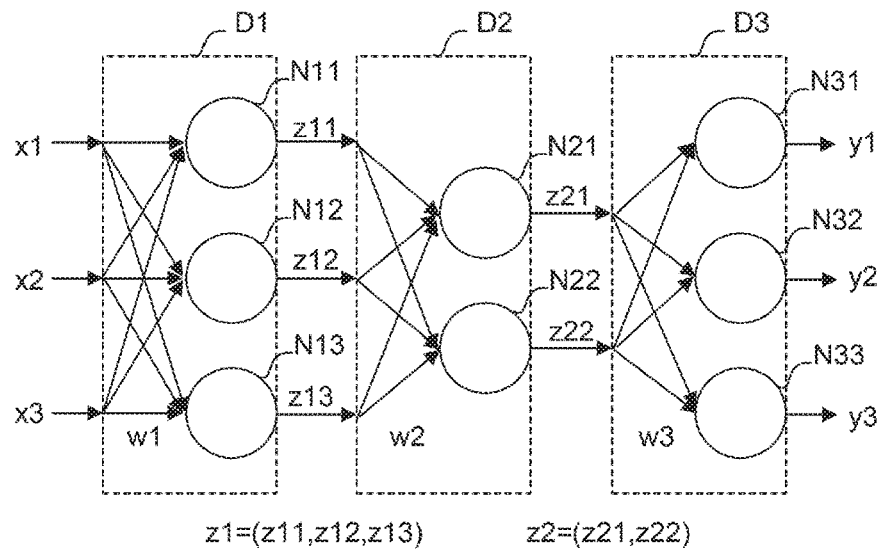
FIG. 7 is a diagram showing the operation of the numerical controller according to the embodiment.

Next, a description of a neural network with three weight layers in which the above neurons are combined with reference to FIG. 7.

FIG. 7 is a schematic diagram of a neural network having weights of three layers D1 to D3. As shown in FIG. 7, input x (for example, input x1 to x3) is input from the left side of the neural network, and result y (result y1 to y3 as an example) is output from the right side of the neural network.

Specifically, each input x1 to x3 is multiplied by the weight corresponded to three neurons N11 to N13. The weight multiplied with the input is denoted as w1. The neurons N11 to N13 output z11 to z13, respectively. Z11 to Z13 are collectively indicated as a feature vector z1, and can be regarded as vectors obtained by extracting feature values of the input vectors. The feature vector z1 is a feature vector between weight w1 and weight w2.

When z11 to z13 are input to two neurons N21 and N22, corresponding weights are multiplied with these z11 to z13. The weights multiplied with the feature vectors are collectively indicated as w2. The neurons N21 and N22 output z21 and z22, respectively. z21 and z22 are collectively indicated as a feature vector z2. The feature vector z2 is a feature vector between weight w2 and weight w3.

When the feature vectors z21 and z22 are input to three neurons N31 to N33, the corresponding weights are multiplied with these feature vectors z21 and z22. The weights multiplied with the feature vectors are collectively indicated as w3.

Finally, the neurons N31 to N33 output the results y1 to y3, respectively.

The behavior of the neural network includes a learning mode and a value prediction mode. A learning dataset is used to compute the weight w in the learning mode, and the parameter is used to determine the action of a machining machine in the prediction mode (here, "prediction" is only for convenience, but various tasks such as detection, classification, and deduction can be included).

It is possible to immediately learn from the data obtained during the actual operation of a machining machine in the prediction mode and reflect the learning result on the next action (online learning). It is also possible to perform collective learning using a previously collected data group and thereafter use the parameters at all time (batch learning). In addition, an intermediate setting, where a learning mode is performed every time data is accumulated by a certain degree, can be assumed.

The weights w1 to w3 can be computed by error back propagation method. Error information enters from the right side and flows to the left side. The error back propagation is a method to adjust (learn) each of the weights to reduce the difference between the output y obtained when the input x is input and a real output y (supervised) for each of the neurons.

The neural network can include three or more layers (called deep learning). It is possible to automatically obtain a calculation unit that extracts the features of inputs on a step-by-step basis and performs the regression of a result only from supervised data.

By using such a neural network as an approximate function, the learning can advance while the actions (1) to (5) in the above reinforcement learning is repeated.

In general, a machine learning device can advance learning to adapt to a new environment by performing additional learning even when being put into the new environment after completing the learning in a certain environment. In the application of machine learning to the adjustment of tailstock pressing force, the device can learn the degree of tailstock pressing force effectively by performing additional learning under new precondition on the past learning, even when machine learning is applied to new precondition (the shape of workpiece as machining target, material of workpiece, spindle feed, cutting amount, etc.

In addition, multiple agents in reinforcement learning are connected via network etc., and information such as state s, action a, reward r can be shared among the agents. The information is used for each agent's learning, and the agent performs distributed reinforcement learning in consideration of the environments of the other agents.

In this invention, multiple agents (machine learning devices) embedded in multiple environments (numerical controllers) perform distributed machine learning with use of network etc., the agents can learn the degree of tailstock pressing force efficiently.

Note that although various methods such as Q-learning, an SARSA method, TD learning, and an AC method have been commonly known as reinforcement learning algorithms, any of the above reinforcement algorithms can be applied to this invention. Since each of the reinforcement learning algorithms is well-known, its detailed description will be omitted in the specification.

Hereinafter, based on a specific embodiment, we will describe the numerical controller in this invention into which a machine learning device is introduced.

(2) Embodiment

Figure 8:
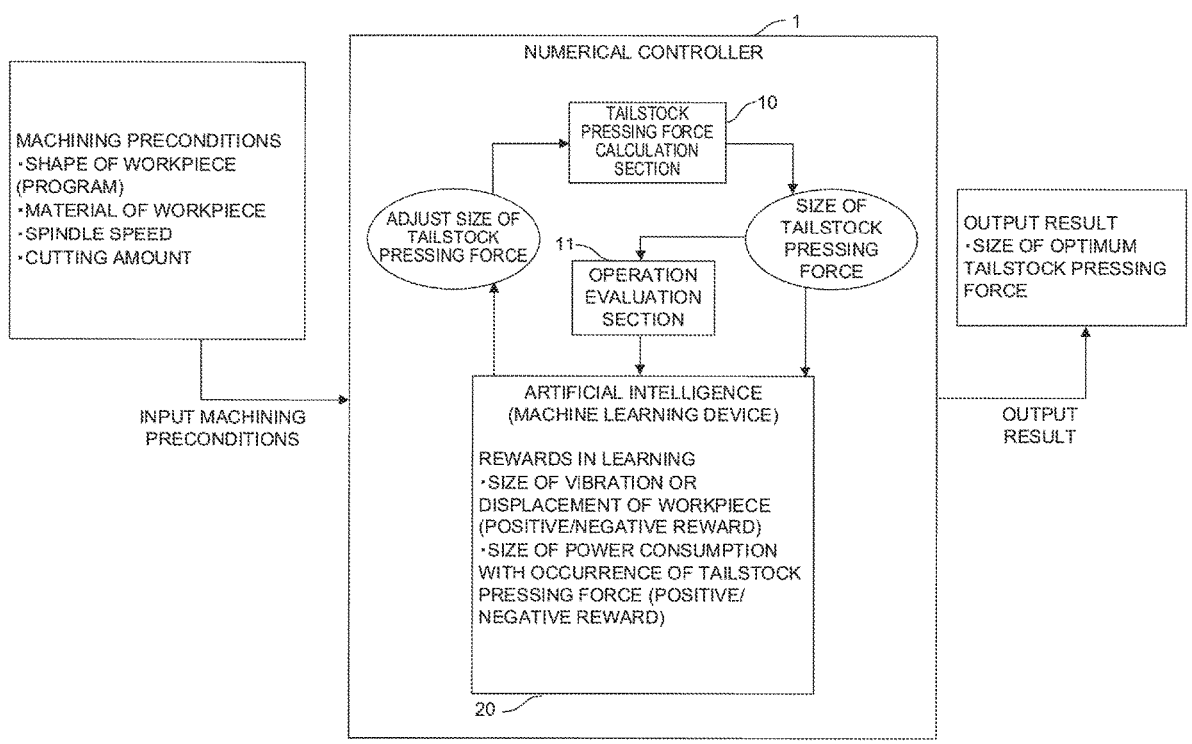
FIG. 8 is a diagram showing the operation and the configuration of the numerical controller according to the embodiment.

FIG. 8 is a diagram showing a machine learning process to adjust tailstock pressing force in numerical controller 1 according to an embodiment of the present invention. Note that FIG. 8 shows only configurations necessary for describing the machine learning process in the numerical controller 1 of the embodiment.

The numerical controller 1 has a tailstock pressing force calculation section 10, an operation evaluation section 11, and a machine learning device 20. The machine learning device 20 acquires machining preconditions as information for specifying an environment (the state $s_t$ described in "(1) Machine Learning"). Further, the machine learning device 20 acquires the degree tailstock pressing force as state information. Further, the machine learning device 20 outputs the action of adjusting the degree of the tailstock pressing force (the action $a_t$ described in "(1) Machine Learning") to the environment.

We will explain the data acquired by the numerical controller 1 as machining preconditions.

The numerical controller 1 gets spindle speed from the sensor in a spindle motor. Further, the numerical controller 1 reads torque from the sensor provided in a tailstock axis motor and regards the torque as tailstock pressing force. Moreover, the numerical controller 1 specifies the material of workpiece from machining information. In addition, the numerical controller 1 specifies the current shape and current cutting amount of the workpiece from computer-aided design (CAD)/computer-aided manufacturing (CAM) data and the progress of a machining program. The machine learning device 20 gets the information described above as machining precondition.

We will further detail the process to specify the current shape and current cutting amount of the workpiece.

The numerical controller 1 gets each of CAD/CAM data defining the completed shape of the workpiece, the block under execution in a machining program, and the remaining move amount of the block by using existing methods. The current cutting amount can be specified from CAD/CAM data and the block under execution in a machining program.

The current shape of a workpiece can be expressed as the data capable of being input by the machine learning device 20 by various methods. Some examples will be described below.

Method 1: The numerical controller 1 assumes the current shape of a workpiece based on CAD/CAM data, the block under execution in a machining program, and the remaining move amount of the block under execution. In FIG. 3(I), a dashed-line rectangle indicates the shape of a workpiece before machining, solid lines with an arrow indicate blocks that have been executed in the machining program, and a dashed line with an arrow indicates the remaining move amount of the block under execution.

Figure 3:
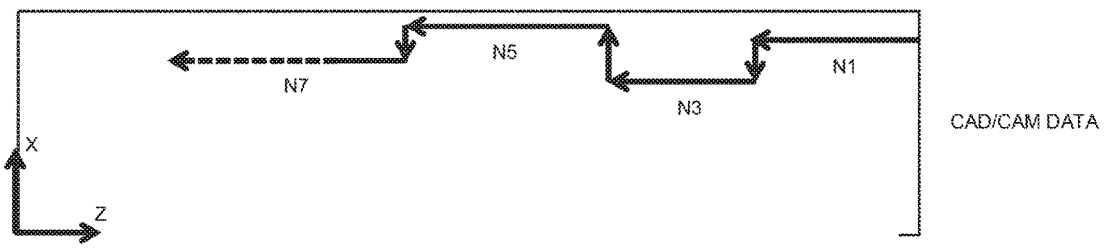
FIG. 3 is a diagram showing the operation of a numerical controller according to an embodiment.
Figure 3:
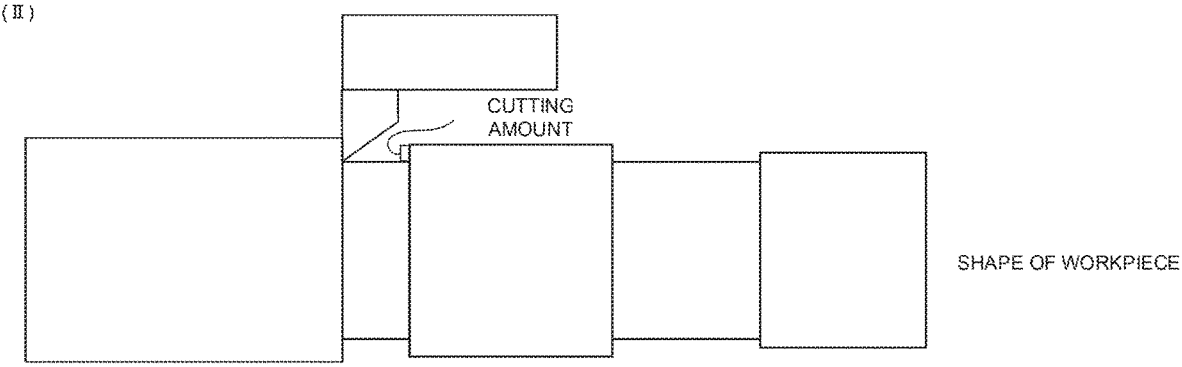

FIG. 3(II) shows the current shape and current cutting amount of the workpiece to be assumed.

Next, the numerical controller 1 sets (N−1) measurement points at regular intervals from one end surface to the other end surface in the Z-axis direction of the current shape of the workpiece, and calculates the diameter of the workpiece at each measurement point and both ends of the workpiece. Then, the numerical controller 1 generates an N-dimensional vector containing values of the N diameters as elements and sets the vector as data indicating the current shape of the workpiece. Note that when the number of measurement points is fixed regardless of the size of workpieces, only N-dimensional vectors can represent the shape of them even if their size are different.

Method 2: Based on CAD/CAM data, the block being executed, and remaining move amount of the block, the numerical controller 1 extracts the combinations of diameters of a workpiece at start or end points and move amounts in Z-axis direction from tailstock position on the respective blocks that have been executed until now. Then, the numerical controller 1 generates a multi-dimensional vector containing records of the combinations as elements, and sets the generated vector as data indicating the current shape of the workpiece. For example, in FIG. 3(I), suppose that the diameter of a workpiece at the start or end point of N1, N3, N5, N7 block is p, q, r, s, respectively. Denote the move amount of N1, N3, N5, N7 block to P, Q, R, S, respectively. The numerical controller 1 generates a multi-dimensional vector M (p, P, q, Q, r, R, s, S), which represents the current shape of the workpiece.

Method 3: Based on CAD/CAM data, the block under execution in a machining program, and the remaining move amount of the block, the numerical controller 1 generates a three-dimensional model of the current shape of a workpiece or a two-dimensional image obtained by projecting the three-dimensional model. Next, the numerical controller 1 extracts feature points from the model or the image by using a known method and sets the feature points as data expressing the current shape of the workpiece. Note that the numerical controller 1 can actually take an image of the workpiece under machining by a photographing device (not shown) and express the current shape of the workpiece by feature points extracted from the taken image.

Further, the machine learning device 20 acquires tailstock pressing force as state information. Here, the initial tailstock pressing force may be determined by a related art method described in, for example, the afore-mentioned Japanese Patent Application Laid-open No. 10-080802, or by operators' input.

When acquiring tailstock pressing force as state information, the operation evaluation section 11 calculates reward (the reward $r_t$ described in "(1) Machine Learning") to be given according to the tailstock pressing force. Hereinafter, a description will be given of an example of reward conditions.

Reward 1: Vibration or Displacement of Workpiece (Positive/Negative Reward)

The numerical controller 1 detects vibration or deflection of workpiece. When the detected vibration or deflection of the workpiece is large, the numerical controller 1 gives negative reward according to the degree. On the other hand, when the detected vibration or deflection of the workpiece is closer to zero, the numerical controller 1 gives positive reward. Typically, it is possible to calculate the magnitude of the vibration or deflection of the workpiece based on a vibration sensor or a displacement sensor provided in a tool, the spindle load, the load on a tool in each control axis direction, the load on tailstock axis, and so on.

Reward 2: Power Consumption with Occurrence of Tailstock Pressing Force (Positive/Negative Reward)

The numerical controller 1 calculates power consumption with the occurrence of tailstock pressing force. When the estimated power consumption is large, the numerical controller 1 gives negative reward according to the degree. On the other hand, when the estimated power consumption is closer to zero, the numerical controller 1 gives positive reward. Typically, it is possible to calculate the degree of the power consumption with the occurrence of tailstock pressing force based on motor current value or resistance value of the tailstock axis.

Note that an operator can appropriately set which data is used to determine the reward.

The machine learning device 20 updates a value function according to evaluation result of the operation evaluation section 11. For example, in Q-learning, a value function is updated according to a known method such as Actor-Critic to adjust tailstock pressing force by which the obtained reward is greater.

Thus, the numerical controller 1 performs machine learning based on input data, output data, and the reward described above. In the machine learning, state $s_t$ is defined by the combination of input data at certain time t, the adjustment of tailstock pressing force performed with respect to the defined state $s_t$ is equivalent to an action $a_t$. The calculated value based on input data newly obtained as a result of the adjustment of the tailstock pressing force with the action $a_t$ is equivalent to a reward $r_{t+1}$. As in "(1) Machine Learning" described above, a state $s_t$, an action $a_t$, and reward $r_{t+1}$ are applied to the update formula of a value function (evaluation function) corresponding to a machine learning algorithm to advance the learning. That is, the machine learning device 20 performs the machine learning (reinforcement learning) based on acquired preconditions and state data, a result of the adjustment of tailstock pressing force performed by the machine learning device 20 itself, and the reward calculated by the reward calculation section 24.

Figure 4:
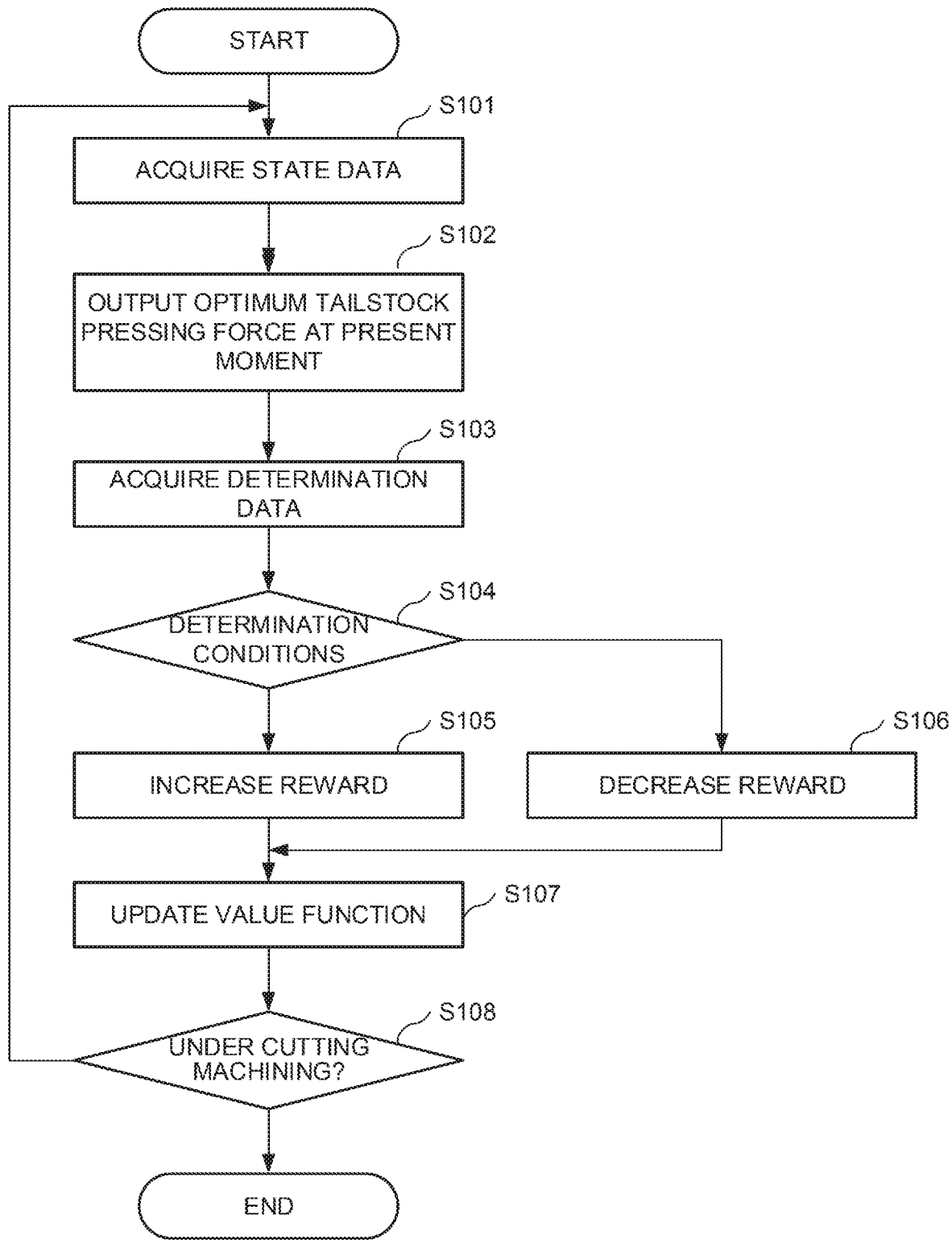
FIG. 4 is a flowchart showing the operation of the numerical controller according to the embodiment.

FIG. 4 will describe the flow of machine learning performed by the numerical controller 1. Hereinafter, the description will be given in line with each step of the flowchart.

Step S101: The machine learning device 20 acquires preconditions such as the material of a workpiece, the current shape of the workpiece, the current cutting amount, and spindle speed and tailstock pressing force indicating state information.

Note that the machine learning device 20 gets any initial value as the tailstock pressing force for the first iteration.

Step S102: The tailstock pressing force calculation section 10 calculates optimum tailstock pressing force at the present moment. That is, when the tailstock pressing force has been adjusted, the tailstock pressing force calculation section 10 slightly adjusts the tailstock pressing force computed in step S101.

Step S103: The operation evaluation section 11 gets determination data to calculate reward with respect to the tailstock pressing force adjusted in step S102. For example, the operation evaluation section 11 calculates vibration or displacement of the workpiece, power consumption by tailstock pressing force, etc.

Steps S104 to S106: The operation evaluation section 11 calculates the reward based on the determination data acquired in step S103 and determination conditions set in advance. For example, the operation evaluation section 11 decreases the reward when the vibration or displacement of the workpiece or the power consumption by tailstock pressing force is large, or increases the reward when it is close to zero.

Step S107: The machine learning device 20 updates a value function according to the reward calculated by the operation evaluation section 11, and calculates and outputs the adjustment value of the tailstock pressing force.

Step S108: The numerical controller 1 iterates the above steps during machining.

By repeating the machine learning as described above, the numerical controller 1 is enabled to obtain an excellent learning result.

Note that when an NC lathe operates using learning data that has been subjected to the above learning, the machine learning device 20 can be attached to the NC lathe so as not to perform new learning such that the NC lathe operates using the learning data that has been subjected to the learning as it is.

In addition, the machine learning device 20 that has completed learning (or machine learning device 20 with completed learning data in learning result storage section 26 copied from other machine learning devices 20) can be attached to other NC lathes so that the NC lathes operate with the learning result as it is.

The machine learning device 20 can perform machine learning alone. However, when each of multiple numerical controllers 1 has a section for external communication, it is possible to send/receive and share their learning results. Thus, more efficient machine learning is enabled.

In order to exchange data between multiple numerical controllers 1 as described above, the communication can be performed via a management apparatus or the like (not shown), the numerical controllers 1 can directly communicate with each other, or a cloud can be used. However, for handling large amount of data, a communication section with faster communication speed is preferred.

According to the embodiment, a numerical controller automatically adjusts tailstock pressing force to reduce vibration or displacement of a workpiece or power consumption by tailstock pressing force as possible. Thus, a user has no need to adjust tailstock pressing force manually. In addition, as for optimizing power consumption by tailstock pressing force, the force is automatically adjusted to reduce the power consumption as possible, which no conventional method has realized.

The embodiment of the present invention is described above. However, the present invention is not limited only to the example of the above embodiment and can be carried out in various aspects with appropriate modifications.

The invention claimed is:

1. A numerical controller including:
a processor configured to perform machine learning to calculate and adjust tailstock pressing force applied to a workpiece by a lathe tailstock to stabilize behavior of the workpiece during lathe machining, the processor configured to:
    acquire preconditions including a current shape of the workpiece,
    acquire, as state information, a current tailstock pressing force,
    acquire, as determination data, a current vibration of the workpiece and at least one of a displacement of the workpiece, and a power consumption by tailstock pressing force,
    compute a reward that is increased when current vibration or the current power consumption is less than a first respective threshold, and is decreased when current vibration or the current power consumption is greater than a second respective threshold, update a value function indicating a value of the state information, based on the determination data and the reward, calculate an adjustment value of the state information based on the value function in an attempt to maximize the reward, and control an actuator of the lathe tailstock based on the adjustment value to adjust the tailstock pressing force of the lathe tailstock during lathe machining.

2. The numerical controller according to claim 1, wherein a current shape of the workpiece is expressed by a diameter of the workpiece.

3. The numerical controller according to claim 1, wherein the current shape of the workpiece is expressed by a feature amount acquired from an image of the workpiece.

4. The numerical controller according to claim 1, wherein the determination data is acquired from at least one of:
a sensor provided in a tool and a motor of a spindle,
a tool control axis, or
the tailstock axis.

* * * * *